(12) United States Patent
Fiske et al.

(10) Patent No.: US 7,000,308 B2
(45) Date of Patent: Feb. 21, 2006

(54) METHOD OF CONSTRUCTING A ROTOR FOR A GYROSCOPIC DEVICE

(75) Inventors: Stephen E. Fiske, Phoenix, AZ (US); Robert E. Winkel, Phoenix, AZ (US)

(73) Assignee: Honeywell International Inc., Morristown, NJ (US)

(*) Notice: Subject to any disclaimer, the term of this patent is extended or adjusted under 35 U.S.C. 154(b) by 116 days.

(21) Appl. No.: 10/062,182

(22) Filed: Jan. 31, 2002

(65) Prior Publication Data

US 2003/0140479 A1    Jul. 31, 2003

(51) Int. Cl.
    *H02K 15/02* (2006.01)
(52) U.S. Cl. .................. 29/598; 29/527.5; 29/732; 29/596; 74/5 R
(58) Field of Classification Search .......... 29/596–598, 29/732–734, 33 C, 527.5, 898.12, DIG. 5, 29/DIG. 8, DIG. 10; 74/5 R, 5.4, 5.7–5.9; 310/44 R, 42, 74
See application file for complete search history.

(56) References Cited

U.S. PATENT DOCUMENTS

| 2,969,682 | A |   | 1/1961  | Schoeppel et al. |
|-----------|---|---|---------|------------------|
| 3,597,117 | A | * | 8/1971  | Zoehfeld ..................... 417/354 |
| 3,664,199 | A | * | 5/1972  | Lahde ....................... 74/5.6 D |
| 3,742,769 | A |   | 7/1973  | Cruteher et al. |
| 4,242,917 | A |   | 1/1981  | Bennett et al. |
| 4,366,615 | A | * | 1/1983  | Strittmatter et al. .......... 29/598 |
| 4,618,791 | A | * | 10/1986 | Morrill et al. ................ 29/598 |
| 5,419,212 | A |   | 5/1995  | Smith |
| 5,474,263 | A | * | 12/1995 | Ford et al. .................... 74/5.12 |
| 5,723,923 | A | * | 3/1998  | Clagett ........................ 310/74 |

* cited by examiner

*Primary Examiner*—Minh Trinh
*Assistant Examiner*—Donghai D. Nguyen
(74) *Attorney, Agent, or Firm*—Kurt A. Luther

(57) ABSTRACT

A method of constructing a rotor for a gyroscopic device is provided comprising fabricating a unitary assembly comprising a rim, a hollow shaft, a hub at each end of the shaft, a web that extends radially inward from the rim to one of the hubs at an angle to a spin axis of the rotor and machining the assembly. A second web may be welded between the rim and the second hub.

6 Claims, 2 Drawing Sheets

METHOD OF CONSTRUCTING A ROTOR FOR A GYROSCOPIC DEVICE

BACKGROUND

This invention relates to control moment gyroscopic devices such as control moment gyroscopes (CMG) and reaction wheel assemblies (RWA).

CMGs and RWAs employ rapidly spinning rotors, powered by electric motors, that have a high cross-axis angular stiffness on the axis that is perpendicular to the spin axis. A low angular stiffness can significantly influence the weight, power, induce vibration (IV) and control requirements of the CMG or RWA. Following conventional teaching, CMG rotors are constructed with several components that are welded together, forming a stiff almost spherical structure. RWAs are a bit different: the rotor does not have as much cross-axis angular stiffness. Sometimes an RWA rotor is one piece, a rim connected to a shaft by a web.

A so-called multi-piece CMG rotor may contain five (5) pieces: a rim, which provides the bulk of rotating mass, and spherically contoured shell halves connecting the rim to a shaft. The components are connected using electron beam welding after some initial fabrication, followed by a final machining step. The manufacturing process is long and expensive. An RWA, having a simpler design because of less stringent structural requirements, is manufactured with less manufacturing steps, often in one piece.

SUMMARY

According to the invention, a rotor is manufactured as a unitary sub assembly that can be used for both light and heavy-duty applications. The subassembly has a rim and a web that extends radially inward to hubs on a hollow shaft that supports the assembly on the rotor's spin axis. For a stronger rotor, an additional web is welded between the rim and the hub, stiffening the subassembly.

An advantage of the design is a simplified rotor costing less and manufactured in less time because only two machined parts are required—the rotor sub assembly and the second web—compared to the five or more parts used to fabricate the typical CMG rotor. Only two welds are required to attach the second web.

DESCRIPTION

Figure 1:
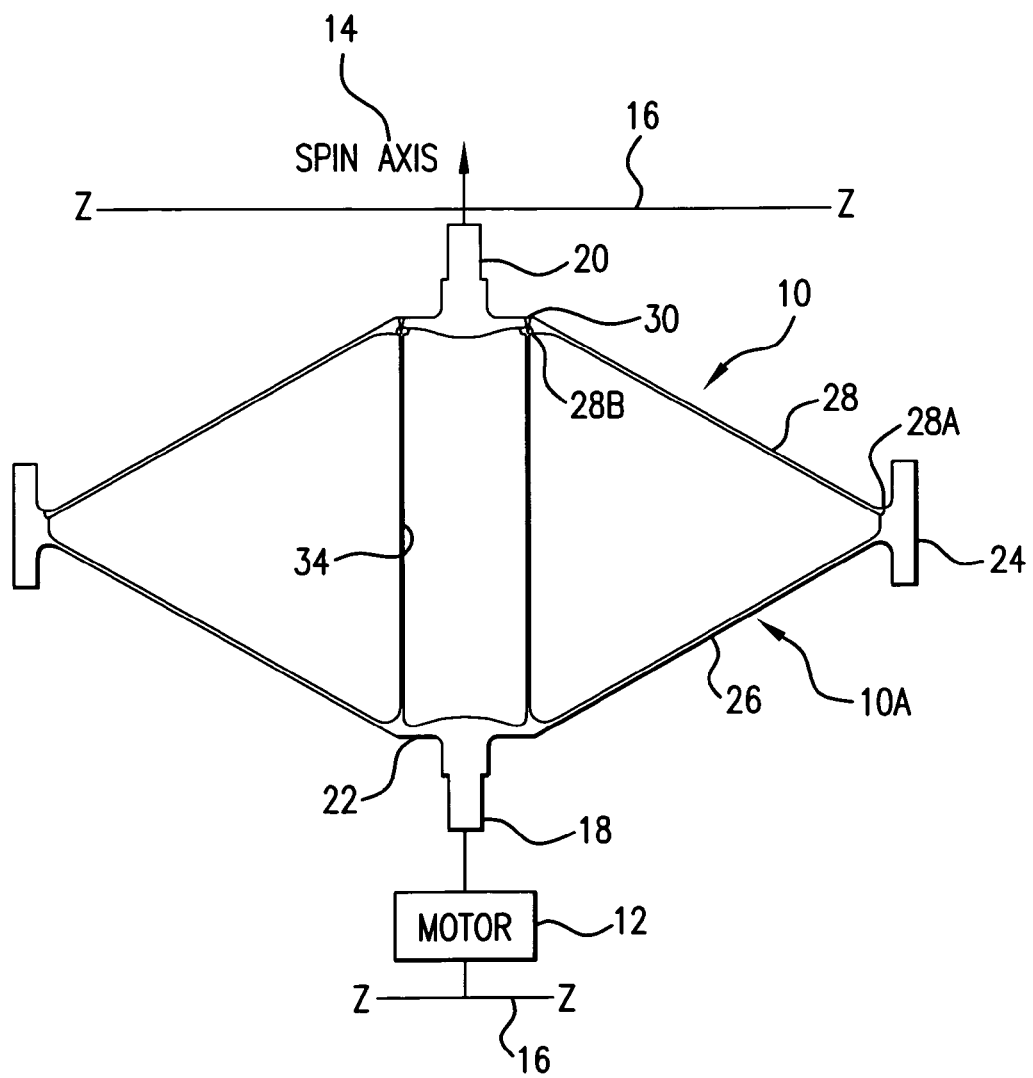
FIG. 1 is a cross section of a rotor according to one aspect of the invention.
Figure 2:
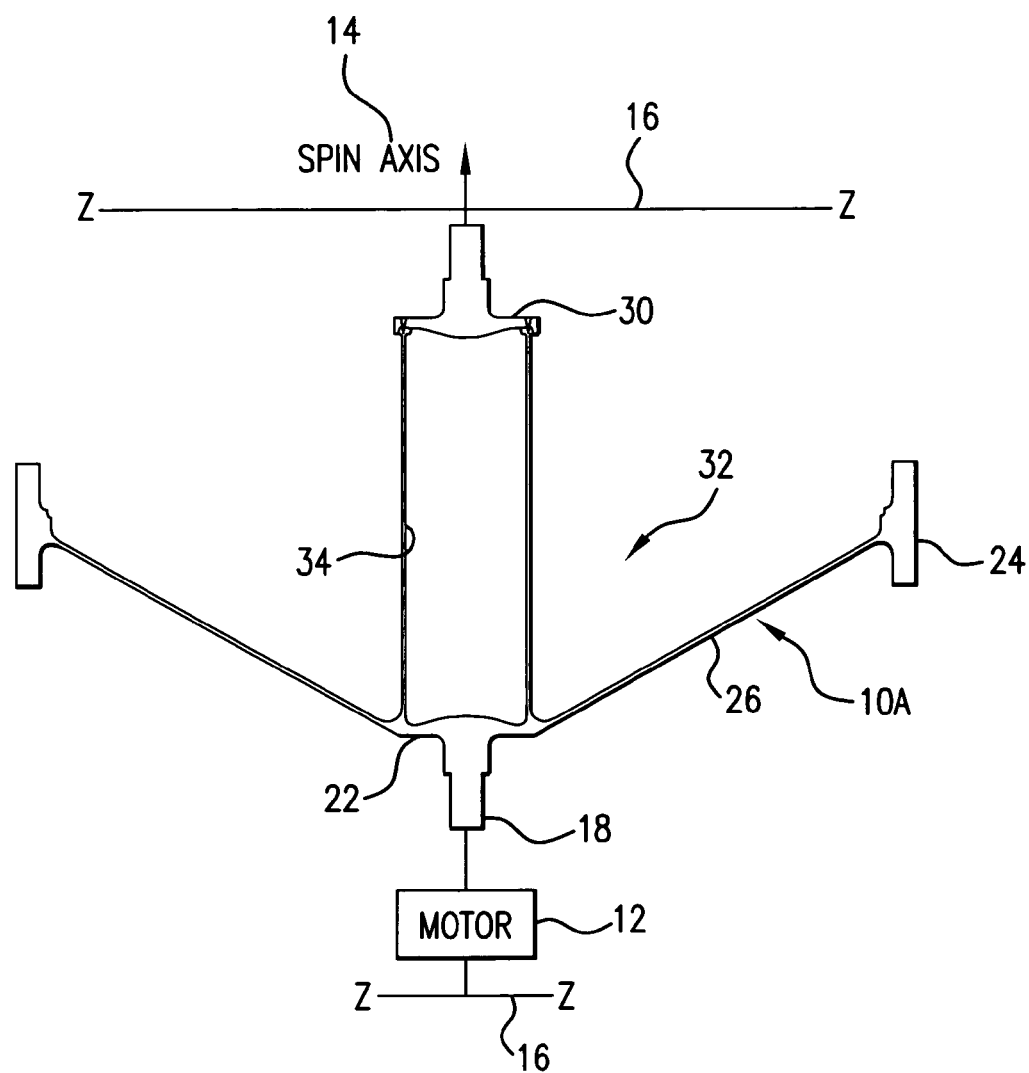
FIG. 2 is a cross section of a rotor according to another aspect of the invention.

Referring to FIG. 1, a rotor 10 in a gyroscopic device is spun by a motor 12 on a spin axis 14 inside a housing simplistically shown by the line 16. The motor is supported by the housing 16 which also supports ends 18 and 20 which connect through hub 22 and 30 of a hollow or tubular shaft 34. The rotor 10 comprises a primary, single-piece sub assembly 10A comprising a rim 24 and a radially extending web 26 between the rim and the hub 22. The subassembly 10A, along with hub 30, comprises the lighter weight rotor, shown in FIG. 2, for an RWA. The length of the rim (along the spin axis) is considerably less that than the shaft 34. The rotor 10 in FIG. 1, intended for heavier duty in a CMG, includes an additional web 28 that extends radially from the rim 24 to an end 30, opposite the end of the hub 22 (from which the web at 26 is formed). The additional web 28 preferably is electron beam welded at weld points 28A and 28B, giving the rotor 10 a discus shape in cross section. In comparison, the lighter duty rotor 32 (only the sub assembly 10A with hub 30), appears like a dish in cross section. In both examples, the unitary subassembly, including the hollow shaft 34, is made from a single forging, wrought, cast or fabricated material and finish machined. The RWA rotor shown in FIG. 2 has significantly greater cross axis angular stiffness than the typical RWA rotor. The highly symmetrical rotor-web shape of the configuration shown in FIG. 1 minimizes the effects of static and dynamic rotor imbalances.

One skilled in the art may make modifications, in whole or in part, to a described embodiment of the invention and its various functions and components without departing from the true scope and spirit of the invention.

What is claimed is:

1. A method of constructing a rotor for a gyroscopic device, the rotor having a spin axis, the method comprising:
    forming a unitary assembly from a single piece of material, the assembly comprising:
        a hollow shaft having a first end, a second end, and a space formed therein,
        a first hub formed on the shaft first end enclosing at least a portion of the space within the shaft, and
        a web that extends radially outward from the hub to a rim at an angle relative to the spin axis of the rotor; and
    coupling a second hub to the shaft second end to enclose a remaining portion of the space within the shaft.

2. The method described in claim 1, wherein the assembly is supported on at least one of the first and the second hubs.

3. The method described in claim 1, wherein the length of the rim is less than the length of the shaft along the spin axis of the rotor.

4. A method of constructing a rotor for a gyroscopic device, the rotor having a spin axis, the method comprising:
    forming a unitary assembly from a single piece of material, the assembly comprising:
        a hollow shaft having two ends and a space formed therebetween,
        a first hub formed on one end of the shaft enclosing at least a portion of the space within the shaft, and
        a web that extends radially outward from the first hub to a rim at an angle relative to the spin axis of the rotor; and
    welding an additional assembly to the unitary assembly, the additional assembly comprising a second hub having a second web extending therefrom the additional assembly coupled between the rim and the other end of the shaft to thereby enclose a remaining portion of the space within the shaft.

5. The method of claim 4 wherein the assembly is supported on the two hubs.

6. The method of claim 5 wherein the length of the rim is less than the length of the shaft along the spin axis of the rotor.

* * * * *